US011630586B2

(12) United States Patent
Goda (10) Patent No.: US 11,630,586 B2
(45) Date of Patent: Apr. 18, 2023

(54) INFORMATION PROCESSING APPARATUS AND METHOD FOR CONTROLLING THE SAME (71) Applicant: CANON KABUSHIKI KAISHA, Tokyo (JP)

(72) Inventor: Keigo Goda, Kawasaki (JP)

(73) Assignee: Canon Kabushiki Kaisha, Tokyo (JP)

(*) Notice: Subject to any disclaimer, the term of this patent is extended or adjusted under 35 U.S.C. 154(b) by 233 days.

(21) Appl. No.: 16/703,106

(22) Filed: Dec. 4, 2019

(65) Prior Publication Data
US 2020/0183595 A1 Jun. 11, 2020

(30) Foreign Application Priority Data
Dec. 11, 2018 (JP) .............................. JP2018-231595

(51) Int. Cl.
G06F 3/06 (2006.01)
G06F 3/12 (2006.01)

(52) U.S. Cl.
CPC .......... *G06F 3/0619* (2013.01); *G06F 3/0623* (2013.01); *G06F 3/0652* (2013.01); *G06F 3/0659* (2013.01); *G06F 3/0676* (2013.01); *G06F 3/1204* (2013.01); *G06F 3/1211* (2013.01); *G06F 3/1238* (2013.01); *G06F 3/1274* (2013.01)

(58) Field of Classification Search
CPC ..... G06F 3/1211; G06F 3/1274; G06F 3/0611
See application file for complete search history.

(56) References Cited

U.S. PATENT DOCUMENTS

| 5,617,380 | A | * | 4/1997 | Holmstrom | G06F 12/0866 369/14 |
| 5,937,427 | A | * | 8/1999 | Shinagawa | G06F 12/0804 711/113 |
| 2002/0174310 | A1 | * | 11/2002 | Ueyama | G06F 12/1416 711/163 |
| 2003/0079078 | A1 | * | 4/2003 | Zipprich | G06F 21/80 711/112 |
| 2004/0181615 | A1 | * | 9/2004 | Masubuchi | G06F 3/1212 710/8 |
| 2007/0168754 | A1 | * | 7/2007 | Zohar | G11B 20/1879 714/42 |
| 2008/0174908 | A1 | * | 7/2008 | Wang | G11B 5/455 360/97.12 |
| 2009/0059739 | A1 | * | 3/2009 | Cas | G11B 7/00458 369/30.21 |
| 2009/0316209 | A1 | * | 12/2009 | Akiyama | H04N 1/2166 358/1.16 |
| 2015/0301936 | A1 | * | 10/2015 | Matsui | G06F 3/0652 711/103 |

FOREIGN PATENT DOCUMENTS

JP 2010-128887 A 6/2010

* cited by examiner

Primary Examiner — Tracy A Warren
(74) Attorney, Agent, or Firm — Canon U.S.A., Inc. IP Division (57) ABSTRACT When a storage unit whose function is enabled is controlled to execute a write process, the storage unit executes the write process using the function. When the storage unit whose function is enabled is controlled to execute an erasure process, the storage unit executes the erasure process without using the function.

9 Claims, 6 Drawing Sheets

INFORMATION PROCESSING APPARATUS AND METHOD FOR CONTROLLING THE SAME

BACKGROUND

Field of the Disclosure

The present disclosure relates to an information processing apparatus and a method for controlling the same.

Description of the Related Art

Some information processing apparatuses (for example, image forming apparatuses) include a hard disk drive (hereinafter referred to as HDD) as a storage device. In some cases, due to the long-term deterioration of the storage medium or the like, data written to the HDD was not correctly recorded. Specifically, some bits of digital data can flip, and such an unintentional event may cause failure such that the data read from the HDD is broken data or a read error occurs on the HDD.

A typical HDD does not verify whether written data has been correctly recorded at the time when the write operation is complete. This is because the operation of reading and verifying data each time the data is written may result in a reduction in throughput. For this reason, even if data is defective when the data is written, the user may not be able to find the defect of the data until they use the data later.

Some HDDs have a write-verify function for reading data immediately after the data has been written and verifying whether the data has been correctly written. For example, Japanese Patent Laid-Open No. 2010-128887 describes a redundant array of inexpensive disks (RAID) device having a write-verify function.

Serial advanced technology attachment (SATA) HDDs, which are generally distributed, support a write-verify function using specifications called Write-Read-Verify Feature. In a HDD supporting the Write-Read-Verify Feature, the write-verify function is set enabled to allow the HDD to automatically verify data when the data is written.

Recent information processing apparatuses have a function called secure erasure. The secure erasure function is intended to prevent information leakage, and is a function of overwriting data stored in the HDD using other data a plurality of times to make it difficult to read the data from the HDD.

An information processing apparatus in which a write-verify function is enabled reads and verifies written data each time a write operation is performed even if the data is written for the purpose of overwriting during the execution of a secure erasure function. A long time may be taken to complete the execution of the secure erasure function.

This may cause the user to wait for the information processing apparatus to complete the execution of the secure erasure function before the user can execute a job.

SUMMARY

The present disclosure provides an information processing apparatus in which user convenience is increased during the execution of a secure erasure function of the information processing apparatus in which a write-verify function is enabled. An information processing apparatus according to an aspect of the present disclosure includes a storage unit having a function of, in response to writing data to the storage unit, reading the written data, and a control unit configured to control the storage unit to execute a write process to write data to one or more storage areas of the storage unit, and an erasure process to overwrite the one or more storage areas of the storage unit at least once. The control unit causes the function to be executed in the write process and causes the function not to be executed in the erasure process.

Further features of the present disclosure will become apparent from the following description of exemplary embodiments with reference to the attached drawings.

BRIEF DESCRIPTION OF THE DRAWINGS

FIG. 3B is a flowchart illustrating a process for setting the write-verify function to on.

DESCRIPTION OF THE EMBODIMENTS

Embodiments of the present disclosure will be described in detail with reference to the accompanying drawings. The following embodiments are not intended to limit the disclosure as defined in the appended claims, and not all the combinations of features described in the embodiments are essential for the disclosure. In the following embodiments, an image forming apparatus is used as an example of an information processing apparatus.

First Embodiment

Figure 1:
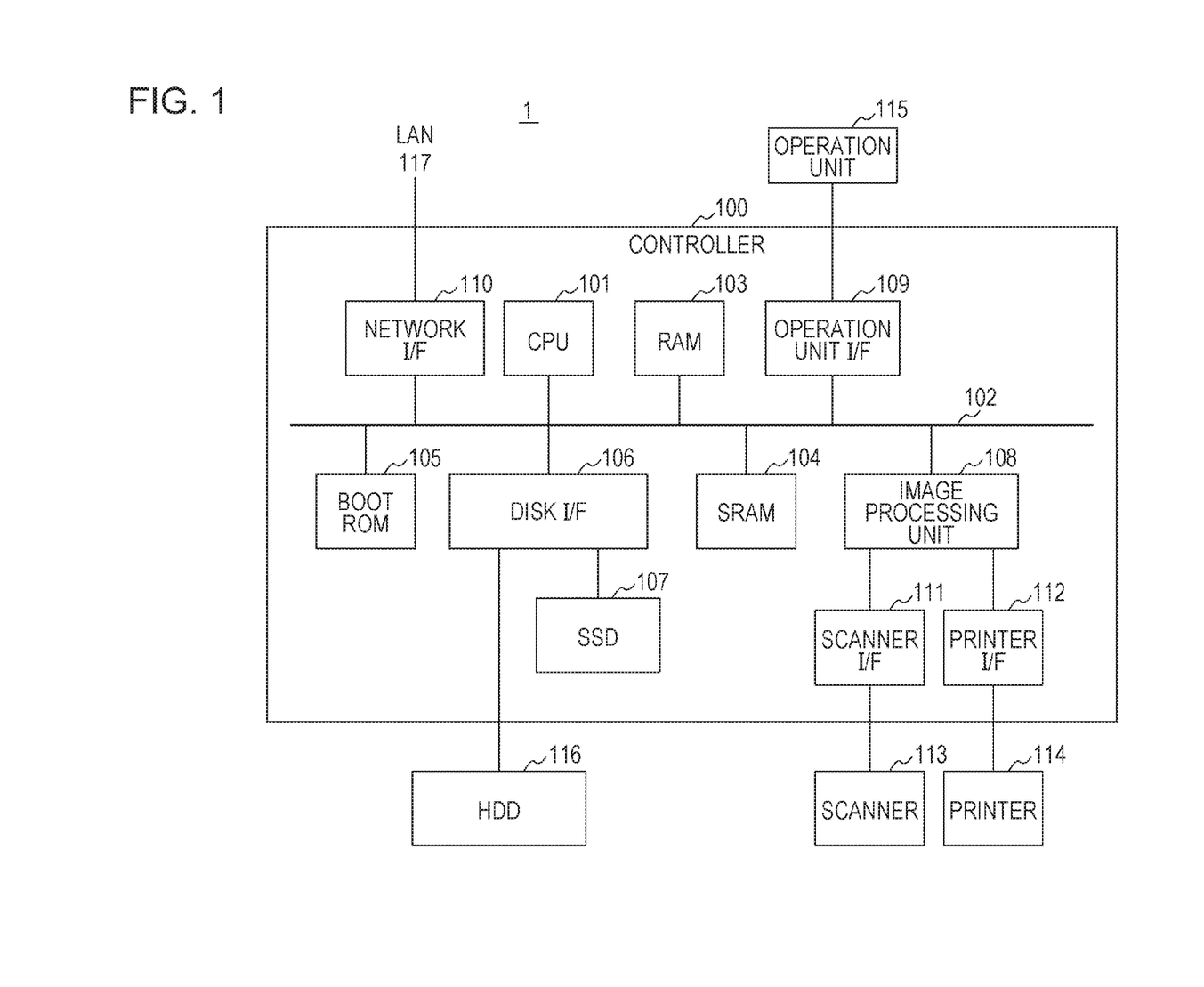
FIG. 1 is a block diagram of an information processing apparatus.

FIG. 1 is a block diagram illustrating an example configuration of an image forming apparatus 1 according to an embodiment of the present disclosure. The image forming apparatus 1 illustrated in FIG. 1 includes a controller 100, which is a central processing unit (CPU) system, a HDD 116, an operation unit 115, a scanner 113, and a printer 114.

The controller 100, which is a CPU system, includes a CPU 101, a boot read-only memory (ROM) 105, a static random access memory (SRAM) 104, a disk interface (I/F) 106, a network I/F 110, a random access memory (RAM) 103, an operation unit I/F 109, and an image processing unit 108. The above-described components are connected to one another via an internal bus 102. The controller 100 further includes a scanner I/F 111, a solid state drive (SSD) 107, and a printer I/F 112.

The CPU 101 executes a software program stored in the RAM 103 to control the overall operation of the image forming apparatus 1.

The RAM 103 stores, for example, a program for starting the controller 100, fixed parameters, and so on.

The boot ROM 105, which is a non-rewritable read-only memory, stores an initial program, called a basic input/output system (BIOS). A sub-CPU (not illustrated) executes the BIOS to recover the CPU 101.

The RAM 103 is used to, for example, store a program or temporary data when the CPU 101 controls the image forming apparatus 1.

The disk I/F 106 controls a storage device. In FIG. 1, the disk I/F 106 controls the SSD 107 and the HDD 116.

The SSD 107 stores firmware, which is executed by the CPU 101 to activate the image forming apparatus 1. The firmware is loaded onto the RAM 103 by the BIOS at the startup of the image forming apparatus 1 and is executed by the CPU 101. While a configuration using an SSD is provided, any non-volatile memory, such as a HDD or an embedded multimedia card (eMMC), may be used.

The HDD 116 is utilized to store a digital image or various kinds of temporary data. The HDD 116 according to this embodiment is a SATA HDD, which supports Write-Read-Verify Feature specifications, and has a write-verify function.

The write-verify function is a function of reading data from a recording medium immediately after the data has been written to the recording medium and verifying whether the data has been correctly written. If it is determined as a result of verification that the data has not been correctly written, the same data is written to the same storage area, and the written data is read to verify whether the data has been correctly written. Accordingly, the write-verify function is performed a plurality of times. The write-verify function is described as a configuration of the image forming apparatus 1 such that the user cannot change the configuration, by way of example, but not limitation. The user's selection may be accepted on an operation screen described below.

The HDD 116 sends the result of executing a command indicating whether the write is successful to the CPU 101 via the disk I/F 106.

When the write-verify function is disabled, the read and verification operation for written data is not performed. This shortens the time taken for the HDD 116 to complete a data write command, compared with when the write-verify function is enabled.

The controller 100 is connected to the operation unit 115 via the operation unit I/F 109. The controller 100 is further connected to a local area network (LAN) 117 via the network I/F 110.

The scanner 113 optically reads an image from a document and converts the image into image data.

The image processing unit 108 is connected to the CPU 101, the printer 114 via the printer I/F 112, and the scanner 113 via the scanner I/F 111. The image processing unit 108 performs image processing, such as color space conversion, using the image data obtained by the scanner 113, and converts the image data into bitmap data. The image processing unit 108 outputs the bitmap data to the printer 114 via the printer I/F 112.

The printer 114 outputs a print based on the accepted image data.

The image forming apparatus 1 is capable of performing other operations such as receiving or outputting a digital image from or to an external computer via the LAN 117, issuing a job, or providing instructions to devices.

The operation unit 115 includes a display panel such as a liquid crystal screen that is used for accepting, from the user, selection of an operating mode such as an image copying mode of the image forming apparatus 1, presenting various types of information of the image forming apparatus 1 to the user, or other purposes. The operation unit 115 may be implemented as a display panel, which is a touch panel, or may have operation buttons in addition to the display screen.

The image forming apparatus 1 according to this embodiment has a secure erasure function. The secure erasure function of the image forming apparatus 1 is a security function (erasure process) that overwrites data stored in the HDD 116 with other data a specified number of times (for example, three times) to make it difficult to read the stored data.

Figure 6:
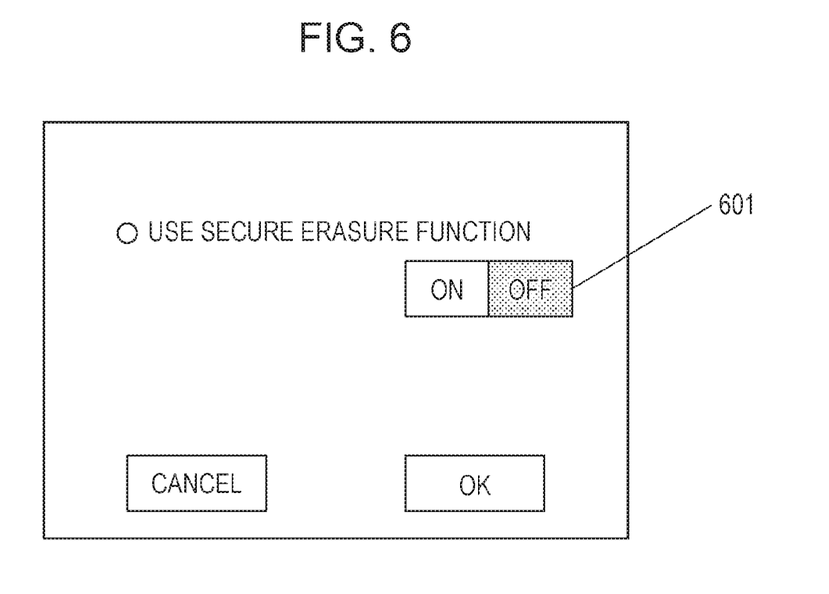
FIG. 6 illustrates a setting screen for setting a secure erasure function to on or off.

The operation unit 115 described above accepts whether to use the secure erasure function from the user through a setting screen displayed on the display panel. A specific example is illustrated in FIG. 6. FIG. 6 illustrates an example of the setting screen displayed on the operation unit 115 to select whether to use the secure erasure function. The user is able to select ON or OFF of the secure erasure function by using a setting button 601.

Next, a copying operation performed by the image forming apparatus 1 will be described with reference to a flowchart illustrated in FIG. 2. The secure erasure function of the image forming apparatus 1 according to this embodiment is a sequential-execution secure erasure function. The sequential-execution secure erasure function is a function of, upon completion of the execution of a copy job or any other job, overwriting image data, which is temporarily saved in the HDD 116 by executing the job, with other data to make it difficult to read the data.

Figure 2:
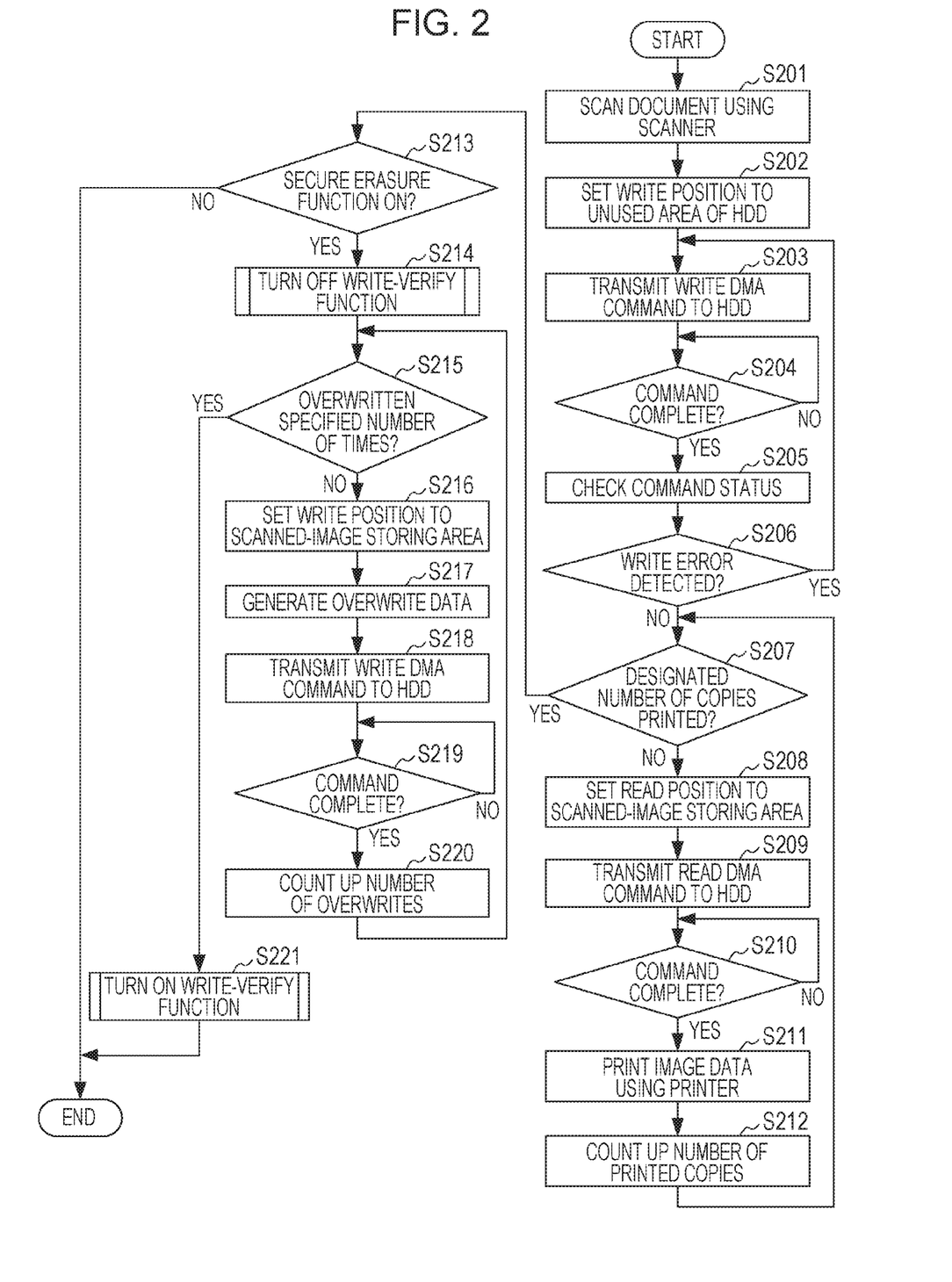
FIG. 2 is a flowchart illustrating a copying operation using a sequential-execution secure erasure function.

In response to an instruction given from the user to execute a copy job through the operation unit 115, the image forming apparatus 1 according to this embodiment starts the flowchart illustrated in FIG. 2. It is noted that the write-verify function of the HDD 116 has been enabled by default when the flowchart starts.

In step S201, the CPU 101 controls the scanner 113 via the scanner I/F 111 to read a document set on the image forming apparatus 1 to generate document data. The document data generated by the scanner 113 is processed by the image processing unit 108 to generate image data, and the image data is stored in the RAM 103. After step S201, the process proceeds to step S202.

In step S202, the CPU 101 determines a data write position (address) in a storage area of the HDD 116. For example, the CPU 101 searches for an unused area of the HDD 116 that is available to store data, and determines the position of the unused area as a write position. After step S202, the process proceeds to step S203.

In step S203, the CPU 101 transmits a write direct memory access (WRITE DMA) command to the HDD 116 via the disk I/F 106. Upon receipt of the command, the HDD 116 writes the image data stored in the RAM 103 to the HDD 116. The WRITE DMA command is given a parameter indicating the write position (address) determined in step S202. The HDD 116 writes the image data to the storage area corresponding to the designated position in the HDD 116.

At this time, the write-verify function has been enabled. Immediately after data has been written to the HDD 116, the HDD 116 reads the data written to the HDD 116 and verifies whether the data has been correctly recorded. The verification may be performed by, for example, comparing data stored in a cache of the HDD 116 with the read data. When the verification of the data is completed, the execution of the WRITE DMA command is complete.

Upon detection that data has not been correctly recorded as a result of verification, some HDDs automatically repeatedly retry to write the data even without any instruction from the CPU 101. In such HDDs, the execution of the WRITE DMA command is complete after retry. If the data has been correctly recorded as a result of retry, the HDDs do not report an error. The number of times the write operation is repeated has an upper limit. When the upper limit is exceeded, the HDD 116 manages the storage area corresponding to the write position determined in step S202 as an unavailable area.

In step S204, the CPU 101 checks the state of the HDD 116 via the disk I/F 106 and determines whether the execution of the command transmitted to the HDD 116 is complete. If the WRITE DMA command is complete, the process proceeds to step S205. If the WRITE DMA command is not complete, the CPU 101 checks the state of the HDD 116 again in step S204.

In step S205, the CPU 101 checks, via the disk I/F 106, the result of executing the WRITE DMA command by the HDD 116.

In step S206, the CPU 101 determines the content of the command execution result that is checked in step S205. The command execution result indicates a write error if the failure to correctly record the data on the HDD 116 is detected as a result of the HDD 116 reading and verifying data written to the HDD 116 in accordance with the WRITE DMA command. If correct recording of the data on the HDD 116 is detected, the command execution result indicates correct writing.

If the command execution result indicates a write error in step S206, the process returns to step S203, and the CPU 101 causes the HDD 116 to retry writing the data. It is known that even data that has not been correctly recorded on the HDD 116 due to the long-term deterioration of the HDD 116 can be correctly recorded by retrying in most cases.

On the other hand, if the command execution result indicates correct writing in step S206, the process proceeds to step S207. In step S207, the CPU 101 determines whether the number of copies, which is designated when the copy job is started, have been printed. If the CPU 101 determines that the copies have not been printed, the process proceeds to step S208.

In step S208, the CPU 101 acquires the write position of image data stored in the HDD 116 in order to read the image data stored in the HDD 116, and determines the write position as a read position. The image data to be read from the HDD 116 is the image data written to the HDD 116 in step S203. After step S208, the process proceeds to step S209.

In step S209, the CPU 101 transmits a READ DMA command to the HDD 116 via the disk I/F 106, and reads the image data recorded on the HDD 116 to the RAM 103. The READ DMA command is given a parameter indicating the read position determined in step S208. The image data is read from the designated position in the HDD 116. The READ DMA command continues until all the read image data is stored in the RAM 103.

In step S210, the CPU 101 checks the state of the HDD 116 via the disk I/F 106 and determines whether the execution of the READ DMA command transmitted to the HDD 116 is complete. If the CPU 101 determines that the READ DMA command is not complete, the CPU 101 waits in step S210 until the execution of the READ DMA command is complete.

On the other hand, if the CPU 101 determines in step S210 that the READ DMA command is complete, the process proceeds to step S211.

In step S211, the CPU 101 causes the printer 114 to print the image data stored in the RAM 103 via the image processing unit 108 and the printer I/F 112. Accordingly, the document scanned in step S201 is copied.

After the completion of copying of the document, in step S212, the CPU 101 counts up the number of printed copies. Then, the process returns to step S207.

If the CPU 101 determines in step S207 that the number of copies, which was designated when the copy job was started, have been printed (the copying operation is completed), the process proceeds to step S213.

In step S213, the CPU 101 checks the setting of the secure erasure function. If the secure erasure function is off, the execution of the copy job is completed (the flowchart illustrated in FIG. 2 ends). If the secure erasure function is on, the process proceeds to step S214. In step S214, the CPU 101 changes the setting to turn off the write-verify function of the HDD 116.

Figure 3A:
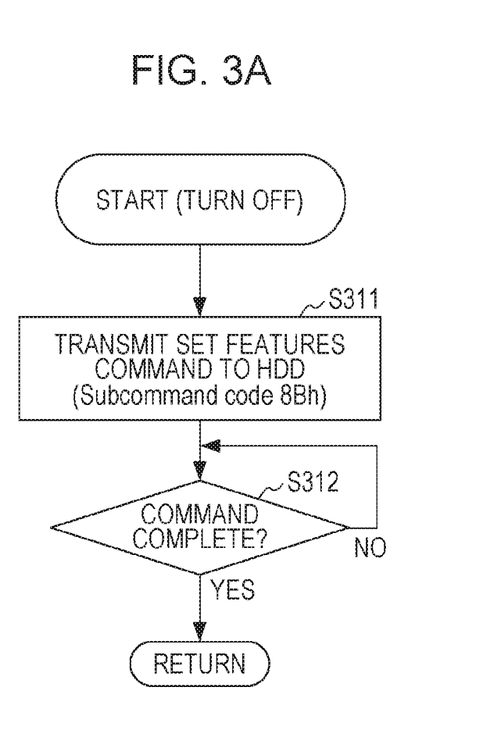
FIG. 3A is a flowchart illustrating a process for setting a write-verify function to off.

The process for changing the setting to turn off the write-verify function by the CPU 101 will now be described with reference to the flowchart illustrated in FIG. 3A.

In step S311, the CPU 101 transmits a SET FEATURES command to the HDD 116 via the disk I/F 106. The SET FEATURES command is a command for changing various settings of the HDD 116. The CPU 101 provides subcommand code 8Bh (Disable Write-Read-Verify feature set) to the HDD 116 as a parameter of the SET FEATURES command. Accordingly, the write-verify function of the HDD 116 can be turned off. Any other command capable of turning off the write-verify function may be used.

After the setting is changed to turn off the write-verify function, the HDD 116 does not perform a verification operation of written data (i.e., does not read or verify written data) even when receiving a command, including the WRITE DMA command, for writing data to a recording medium.

Then, in step S312, the CPU 101 checks the state of the HDD 116 via the disk I/F 106 and determines whether the execution of the command transmitted to the HDD 116 is complete. The CPU 101 determines that the setting has been changed to turn off the write-verify function by confirming completion of the execution of the SET FEATURES command.

Through the flowchart described above, the CPU 101 completes the process for turning off the write-verify function, and then returns to the flowchart illustrated in FIG. 2.

In step S215, the CPU 101 determines whether the data overwriting process has been executed a specified number of times by using the secure erasure function. If the CPU 101 determines that the overwriting operation has been executed the specified number of times, the process proceeds to step S221. The processing of step S221 will be described below. If the CPU 101 determines that the overwriting operation has not been executed the specified number of times, the process proceeds to step S216.

In step S216, the CPU 101 determines a write position to write the data to the HDD 116 by using the secure erasure function. The CPU 101 determines the write position of the image data stored in the HDD 116 in step S203 as a write position of the target to be overwritten by using the secure erasure function.

In step S217, the CPU 101 generates overwrite data to be written to the HDD 116. The overwrite data is used in the data overwriting process using the secure erasure function. The CPU 101 typically generates data having random content by using a pseudorandom number algorithm or the like, and stores the generated data in the RAM 103.

In step S218, the CPU 101 transmits a WRITE DMA command to the HDD 116 via the disk I/F 106 to write the overwrite data stored in the RAM 103 to the HDD 116. The WRITE DMA command is given a parameter indicating the write position determined in step S216. Upon receipt of the WRITE DMA command, the HDD 116 writes the overwrite data to the storage area corresponding to the write position included in the command.

At this time, the write-verify function of the HDD 116 is off. Thus, the HDD 116 determines that the execution of the WRITE DMA command is complete at the time when the data is written to the recording medium, and does not perform a verification operation. That is, when the write-verify function is off, the WRITE DMA command completes for a shorter period of time than when the write-verify function is on.

In step S219, the CPU 101 checks the state of the HDD 116 via the disk I/F 106 and determines whether the execution of the command transmitted to the HDD 116 is complete.

If it is determined in step S219 that the WRITE DMA command is complete, the process proceeds to step S220. If the WRITE DMA command is not complete, the CPU 101 repeatedly performs the processing of step S219.

In step S220, the CPU 101 counts up the number of overwriting operations performed using the secure erasure function. Then, the process returns to step S215. If the CPU 101 determines in step S215 that the overwriting operation has not been executed the specified number of times, the processing of steps S216 to S220 is repeatedly performed.

On the other hand, if the CPU 101 determines in step S215 that the overwriting operation has been executed the specified number of times, the process proceeds to step S221.

In step S221, the CPU 101 changes the setting to turn on the write-verify function of the HDD 116. The process for changing the setting to turn on the write-verify function will now be described in detail with reference to FIG. 3B.

Figure 3B:
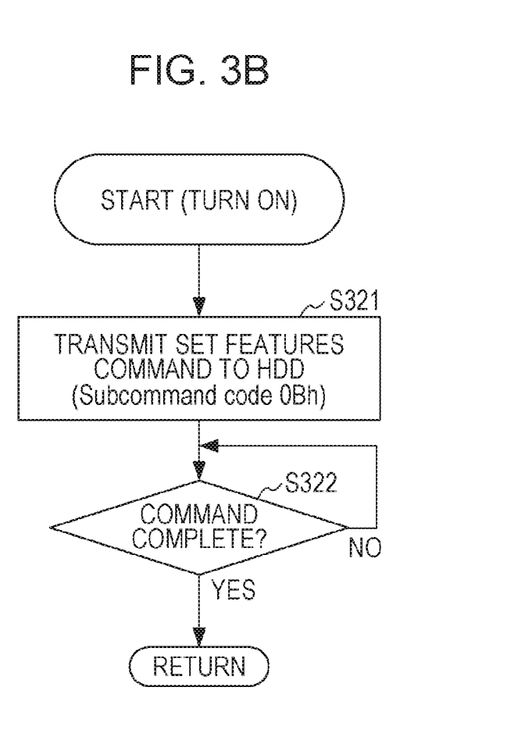

In step S321, the CPU 101 transmits a SET FEATURES command to the HDD 116 via the disk I/F 106. The CPU 101 provides subcommand code 0Bh (Enable Write-Read-Verify feature set) to the HDD 116 as a parameter of the SET FEATURES command. Accordingly, the setting can be changed to turn on the write-verify function of the HDD 116. Any other command capable of turning on the write-verify function may be used.

After the setting is changed to turn on the write-verify function, the HDD 116 performs a verification operation of written data upon receipt of a command, including the WRITE DMA command, for writing data to a recording medium.

Then, in step S322, the CPU 101 checks the state of the HDD 116 via the disk I/F 106 and determines whether the execution of the command transmitted to the HDD 116 is complete. The CPU 101 determines that the setting has been changed to turn on the write-verify function by confirming completion of the execution of the SET FEATURES command. The CPU 101 then returns to the flowchart illustrated in FIG. 2.

After step S221 completes, the execution of the copy job is completed (the processing illustrated in FIG. 2 is finished).

Figure 5A:
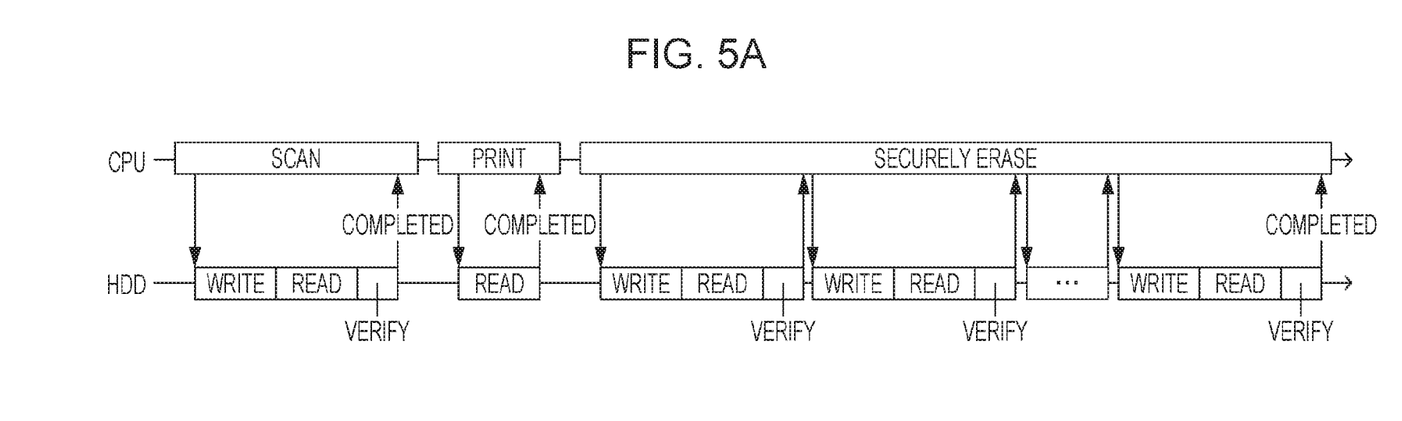
FIGS. 5A and 5B illustrate the effect of reducing the write time when an embodiment of the present disclosure is applied.
Figure 5B:
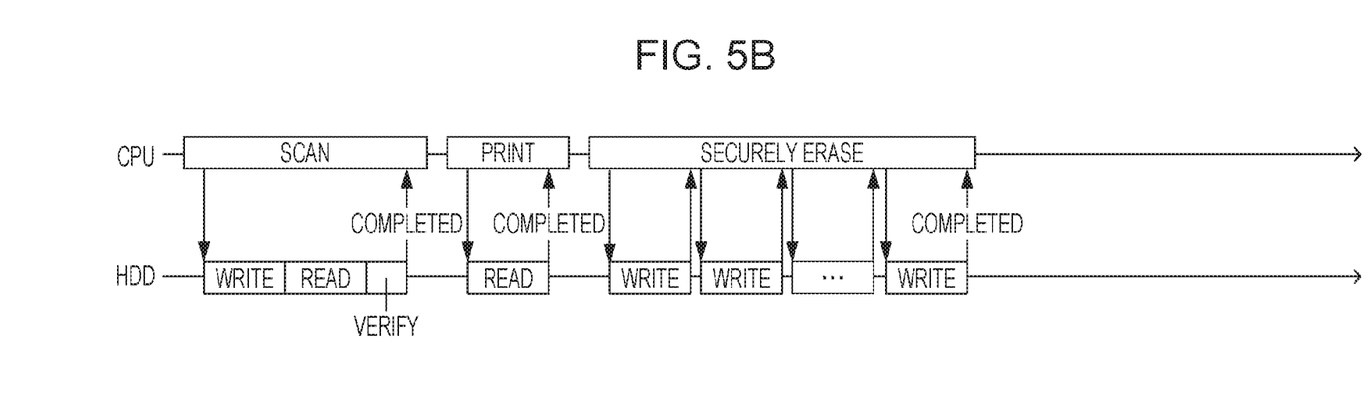

The effect of reducing the time taken to execute the secure erasure function according to this embodiment will be described with reference to FIGS. 5A and 5B. In FIGS. 5A and 5B, the horizontal axis represents the length of time taken to read or write data from or to the HDD 116 during the copying operation of the image forming apparatus 1. FIG. 5A illustrates a configuration according to a comparative example, and FIG. 5B illustrates a configuration according to an embodiment of the present disclosure.

First, the comparative example will be described with reference to FIG. 5A. FIG. 5A illustrates reading and writing of data from and to the HDD 116, which has a write-verify function, with the write-verify function of the HDD 116 being enabled, when a copy job is executed without using an embodiment of the present disclosure.

The CPU 101 performs a write-verify operation when data is written to the HDD 116 during scanning using the scanner 113. The CPU 101 then performs reading during printing using the printer 114. When the copying operation is completed, the secure erasure function is executed to perform a plurality of overwriting operations. In each of the plurality of overwriting operations performed by executing the secure erasure function, the write-verify operation is performed.

That is, the write-verify function ensures that data is correctly written. However, the write-verify function is performed even during a plurality of overwriting operations performed by executing the secure erasure function, which takes a longer time.

In contrast, FIG. 5B illustrates reading and writing of data from and to the HDD 116, which has a write-verify function, with the write-verify function of the HDD 116 being enabled, when a copy job is executed according to an embodiment of the present disclosure.

The CPU 101 performs a write-verify operation when data is written to the HDD 116 during scanning using the scanner 113. The CPU 101 then performs reading during printing using the printer 114. When the copying operation is completed, the secure erasure function is executed to perform a plurality of overwriting operations. In this case, the write-verify operation is not performed in each of the plurality of overwriting operations performed by executing the secure erasure function.

That is, the write-verify function ensures that data is correctly written. In addition, the write-verify function is not performed during a plurality of overwriting operations performed by executing the secure erasure function. This results in a reduction in the time taken to execute the secure erasure function.

As described above, according to an image forming apparatus according to this embodiment, it is possible to increase user convenience during the execution of a secure erasure function of an information processing apparatus in which a write-verify function is enabled.

While a copying operation (copy job) of an image forming apparatus having a secure erasure function has been described with reference to this embodiment, the present disclosure is not limited to the copying operation. In an embodiment of the present disclosure, for example, an operation (print job) of printing image data received from an external computer via the LAN 117 may be performed, and the secure erasure function may be executed. Any other job may be used in which an operation of temporarily storing image data in a HDD and the secure erasure function is executed when the job is executed.

Second Embodiment

The first embodiment provides a configuration for a sequential-execution secure erasure function. A second embodiment provides a configuration for a block-erasure-type secure erasure function. The block-erasure-type secure erasure function is a function of overwriting an entire recording area of a HDD with other data at the time when a user gives an erasure instruction.

The block-erasure-type secure erasure function is a function used for preventing leakage of data residing on a HDD of an image forming apparatus before the image forming apparatus is disposed of, for example.

The block-erasure-type secure erasure function, which is performed by the image forming apparatus 1, will be described with reference to a flowchart illustrated in FIG. 4.

Figure 4:
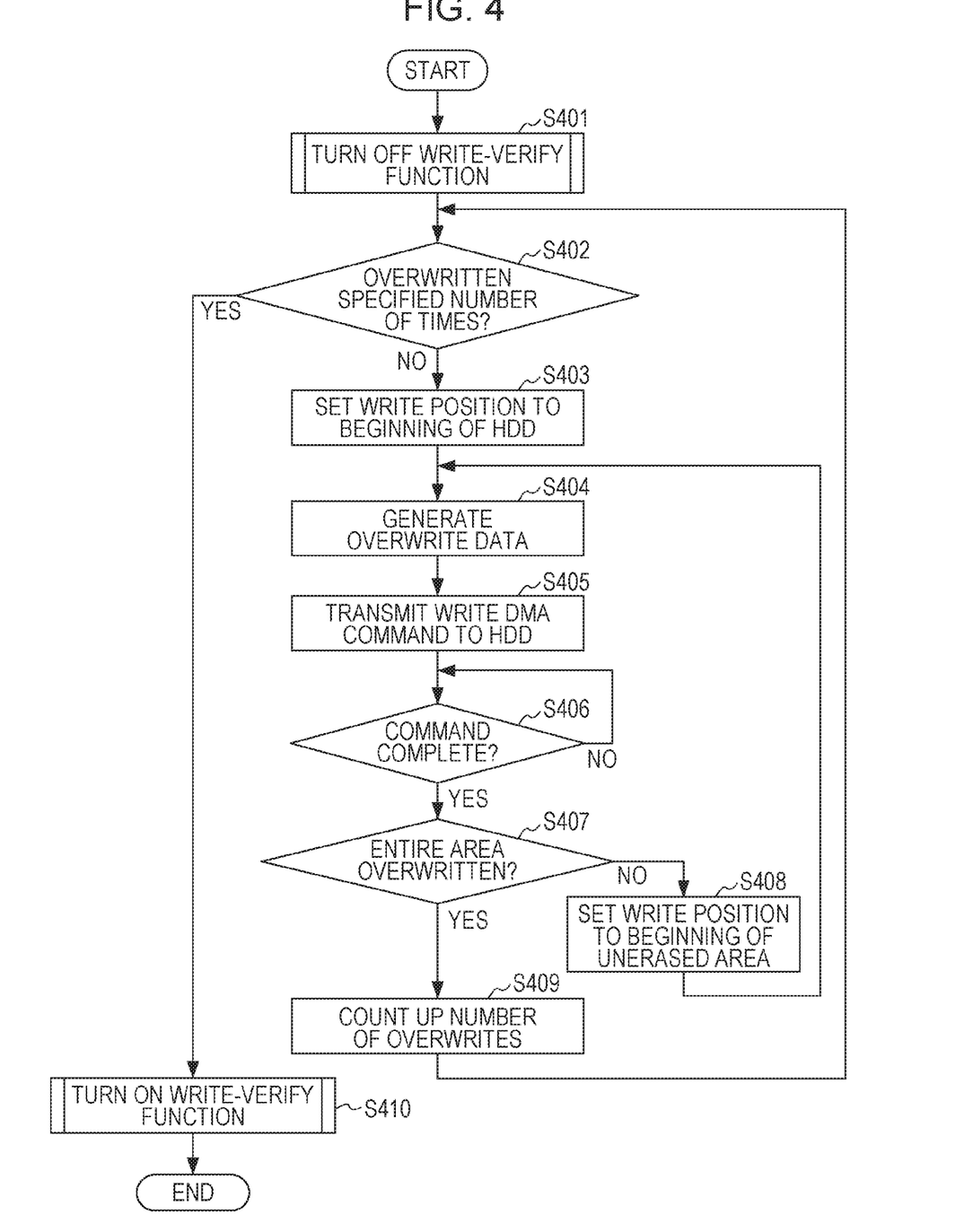
FIG. 4 is a flowchart illustrating a copying operation using a block-erasure-type secure erasure function.

In response to an instruction given from a user to execute the block-erasure-type secure erasure function through the operation unit 115, the image forming apparatus 1 according to this embodiment starts the flowchart illustrated in FIG. 4. It is noted that, as in the first embodiment, the write-verify function of the HDD 116 has been enabled by default when the flowchart starts.

In step S401, the CPU 101 changes the setting to turn off the write-verify function of the HDD 116 in the way described above with reference to FIG. 3A.

In step S402, the CPU 101 determines whether the data overwriting process has been executed on all the storage areas to be erased in a batch (hereinafter referred to as entire storage area) a specified number of times by using the secure erasure function. The CPU 101 determines whether the overwriting process has been executed the specified number of times. If the overwriting process has been executed the specified number of times, the process proceeds to step S410. The processing of step S410 will be described below. If the number of overwriting operations has not reached the specified number of times, the process proceeds to step S403.

In step S403, the CPU 101 determines a data write position in a storage area of the HDD 116. Since the block-erasure-type secure erasure function is a function of writing overwrite data to the entire storage area of the HDD 116, all the pieces of overwrite data to be written to the HDD 116 need to be stored in the RAM 103 in order to overwriting the entire storage area of the HDD 116 for erasure at once.

Since the HDD 116 typically has a larger storage capacity than the RAM 103, it is difficult to store all the pieces of overwrite data to be written to the entire storage area of the HDD 116 in the RAM 103 at once. To address this difficulty, the entire storage area is divided into a plurality of sections, and each of the sections is overwritten with data the specified number of times. That is, in order to overwrite the entire storage area for erasure at once, an overwriting process is performed a plurality of times, each time changing the beginning of the section to be written.

Specifically, the write position determined in step S403 indicates the beginning of a predetermined storage area among a plurality of storage areas of the HDD 116.

In step S404, the CPU 101 generates overwrite data to be used in the data overwriting process using the secure erasure function. The overwrite data is data generated by using a pseudorandom number algorithm or the like and having random content. The CPU 101 stores the generated data in the RAM 103.

In step S405, the CPU 101 transmits a WRITE DMA command to the HDD 116 via the disk I/F 106 to write the overwrite data stored in the RAM 103 to the HDD 116. The WRITE DMA command is given a parameter indicating the write position determined in step S403, and the overwrite data is written to a portion of the entire storage area of the HDD 116. At this time, since the write-verify function is off, the data reading and verifying operation is not performed.

In step S406, the CPU 101 checks the state of the HDD 116 via the disk I/F 106 and determines whether the execution of the command transmitted to the HDD 116 is complete. If the WRITE DMA command transmitted in step S405 is complete, the process proceeds to step S407. If the transmitted WRITE DMA command is not complete, the CPU 101 checks the state of the HDD 116 again in step S406.

In step S407, the CPU 101 determines whether the overwrite data has been written to the entire storage area of the HDD 116. If the CPU 101 determines that the overwrite data has been written to the entire storage area of the HDD 116, the process proceeds to step S409. In step S409, the CPU 101 counts up the number of times the overwriting process has been executed on the entire storage area of the HDD 116. Then, the process returns to step S402.

If the CPU 101 determines in step S407 that the overwrite data has not been written to the entire storage area of the HDD 116, the process proceeds to step S408.

In step S408, the CPU 101 determines the next data write position. The data write position determined here is, for example, the beginning of a storage area that is not written in step S407. After step S408, the process returns to step S404.

Referring back to step S402, if the overwriting process has been executed the specified number of times, the process proceeds to step S410.

In step S410, the CPU 101 changes the setting to turn on the write-verify function of the HDD 116 in the way described above with reference to FIG. 3B. Then, the flowchart ends.

As described above, according to an image forming apparatus according to this embodiment, it is also possible to increase user convenience during the execution of a secure erasure function of an information processing apparatus in which a write-verify function is enabled.

The storage areas of the HDD 116 include an image area that stores temporary data such as image data, and a system area that stores system data. In the second embodiment, all the storage areas to be erased in a batch (i.e., the entire storage area) include at least the image area.

Other Embodiments

While various examples and embodiments of the present disclosure have been described, the spirit and scope of the present disclosure are not limited to any specific example or embodiment disclosed herein.

The embodiments of the present disclosure may also be realized as follows. A program implementing one or more functions in the embodiments described above is provided to a system or an apparatus via a network or a storage medium, and one or more processors in a computer of the system or apparatus read and execute the program. The embodiments of the present disclosure may also be realized by a circuit that implements one or more functions (for example, an application-specific integrated circuit (ASIC)).

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-231595, filed Dec. 11, 2018, which is hereby incorporated by reference herein in its entirety.

What is claimed is:

1. An information processing apparatus comprising:
a storage unit having a verify function such that when data is written to a storage area of the storage unit, the storage unit verifies that the data was written without errors; and
a controller configured to perform:
writing data of a print job to one or more storage areas of the storage unit, reading out the written data, and executing the print job,
determining whether secure erasure is set for the print job, and
in a case where secure erasure is set for the print job, disabling the verify function of the storage unit, and causing the one or more areas of the storage unit to be overwritten with overwrite data a predetermined number of times upon completion of the execution of the print job.

2. The information processing apparatus according to claim 1,
wherein the controller accepts an erasure setting from a user, and
sets the default secure eraser setting for the image forming apparatus on the basis of the erasure setting.

3. The information processing apparatus according to claim 2, wherein the controller performs the secure erasure on the basis that the default secure erasure setting is enabled.

4. The information processing apparatus according to claim 1, wherein the controller enables the verify function, which is disabled, in response to completion of the writing of the overwrite data the predetermined number of times.

5. The information processing apparatus according to claim 1, wherein the storage unit is a hard disk drive.

6. A method for controlling an information processing apparatus including a storage device having a verify function such that when data is written to a storage area of the storage device, the storage device verifies that the data was written without errors , the method comprising:
writing data of a print job to one or more storage areas of the storage device, reading out the written data, and executing the print job;
determining whether secure erasure is set for the print job;
disabling the verify function of the storage device in a case where secure erasure is set for the print job; and
causing the one or more areas of the storage device to be overwritten with overwrite data a predetermined number of times upon completion of the execution of the print job.

7. The method according to claim 6, further comprising accepting an erasure setting from a user; and
setting the default secure eraser setting for the image forming apparatus on the basis of the erasure setting.

8. The method according to claim 6, wherein the verify function that is disabled is enabled in response to completion of the writing of the overwrite data the predetermined number of times.

9. The method according to claim 6, wherein the storage device is a hard disk drive.

* * * * *